No. 732,929. Patented July 7, 1903.

UNITED STATES PATENT OFFICE.

ANDREW A. DUNHAM, OF NEW YORK, N. Y., ASSIGNOR TO THE CASEIN COMPANY OF AMERICA, A CORPORATION OF NEW JERSEY.

FOOD PRODUCT AND PROCESS OF PRODUCING SAME.

SPECIFICATION forming part of Letters Patent No. 732,929, dated July 7, 1903.

Application filed November 6, 1902. Serial No. 130,258. (No specimens.)

*To all whom it may concern:*

Be it known that I, ANDREW A. DUNHAM, a citizen of the United States, residing at New York, in the county of New York and State of New York, have invented or discovered certain new and useful Improvements in Food Products and Processes for Producing Same, of which the following is a specification.

Many attempts have been made to prepare a casein product to be used as a substitute for eggs in cooking, &c.; but so far as is known to me no such preparation has heretofore been offered which possessed the desirable properties of eggs, or desiccated eggs. Many attempts have heretofore been made in this line, but of the products heretofore on the market some have the great disadvantage of being insoluble, while others have a very disagreeable and cheesy odor, due to the casein which they contain. This of course is very objectionable in a food product, as articles of food in which such products have been used have possessed this disagreeable odor and taste to a marked degree.

My invention or discovery relates to a substitute for eggs which entirely avoids the aforesaid disadvantages, inasmuch as it is perfectly soluble in hot or cold water or milk and has but very little odor of any kind.

In carrying my invention or discovery into effect fresh milk, preferably with the fat removed, is precipitated, preferably by means of an acid, although rennet may be used if so desired. As soon as the curd is completely precipitated the whey is drawn therefrom and the curd thoroughly washed in water. The water is then decanted and otherwise removed from the curd as completely as possible, preferably by pressure in any desirable manner. The moist casein is then broken up as finely as possible, and after being weighed is transferred to a dough-mixer or any suitable mixing device. To every one hundred pounds of the moist casein I then add seventeen pounds of desiccated milk, to which about two and one-half pounds of bicarbonate of soda has previously been added; or, if preferred, the bicarbonate of soda may be mixed first with the moist casein by means of a mixing-machine and the milk-powder then added. The casein, desiccated milk, and bicarbonate of soda are agitated in the mixer until a uniform mixture results, when about two pounds of egg albumen or desiccated eggs and one pound of sodium chlorid are added and the mixing continued until all of the ingredients are thoroughly incorporated together. The slightly-moist mixture is then dried in any suitable manner, preferably by being spread on muslin trays and subjected to a blast of air at about 120° Fahrenheit. If it be desired, a certain percentage of coloring-matter, such as annatto or an anilin coloring-matter, may be added to the mixture to give the finished product the appearance of desiccated eggs, although this step is not essential.

I am aware that it is not broadly new to render casein soluble by the use of bicarbonate of soda. This, however, has heretofore been done by mixing with dry casein a saturated solution of bicarbonate of soda or other alkali. While a soluble product is obtained by this process, it has serious disadvantages owing to the fact that the bicarbonate of soda does not thoroughly penetrate or combine with the particles of casein, but seems to merely lodge upon the surface of these particles and by grinding the bicarbonate of soda is disengaged therefrom. There has also been in use a process which consists in kneading casein in a putty-like condition with alkali, and after the casein has attained a spongy condition it is dried by any suitable means. This process, while producing a soluble product, has serious disadvantages, inasmuch as the spongy alkalized casein dries with the greatest difficulty, owing to the fact that the outside of the spongy mass dries much more quickly than the inside, thus forming a horn-like shell and rendering it almost impossible for the moisture to escape from the interior of the casein. Furthermore, this gummy mass sticks to the drying trays or screens and is removed with great difficulty. By my process I entirely overcome these disadvantages by adding to the somewhat-moist casein a suitable amount of dry powder to absorb the moisture contained by the casein and render the mixture in an almost dry condition, which crumbles easily in the hands and dries uniformly and very rapidly and is not sufficiently adhesive to stick to the drying trays or screens. By my process a complete chemical combination takes place between the casein and bicarbonate of soda and the entire amount of casein thoroughly absorbs a portion of the bicarbonate of soda.

I do not wish to limit myself to the exact proportions of the several ingredients as above stated, as they may be varied somewhat without materially affecting the product; but I have found the above-stated proportions of the ingredients to give the most satisfactory results. Neither do I wish to limit myself to bicarbonate of soda as an alkali, as any suitable alkaline salt may be used; but I prefer the bicarbonate of soda, as it forms a perfectly harmless product.

This product when used as a substitute for eggs in cooking serves the same purpose as is served by eggs, being almost the same chemically, and owing to its cheapness, keeping qualities, and small bulk it is of great value for use in bakeries and for household purposes.

Having thus described my invention or discovery, what I claim, and desire to secure by Letters Patent, is—

1. The herein-described food product consisting of casein, an alkali, desiccated milk, egg albumen and sodium chlorid, in substantially the proportions specified and thoroughly mixed together.

2. The herein-described food product for use as a substitute for eggs, and consisting of casein, bicarbonate of soda, desiccated milk, egg albumen and sodium chlorid in substantially the proportions specified and thoroughly incorporated together.

3. The herein-described process for producing a substitute for eggs, consisting in mixing with moist casein, from which the whey has been eliminated, desiccated milk, an alkali, egg albumen and sodium chlorid, until all of the ingredients have become thoroughly incorporated together, and then drying the resulting mixture.

4. The herein-described process for producing a substitute for eggs, consisting in mixing with moist casein, from which the whey has been eliminated, desiccated milk, bicarbonate of soda, egg albumen and sodium chlorid until all of the ingredients have become thoroughly incorporated together and then drying the resulting mixture.

5. The herein-described process for producing a substitute for eggs, consisting in mixing with moist casein, from which the whey has been eliminated, desiccated milk and bicarbonate of soda until the ingredients have become thoroughly incorporated, then mixing with the first mixture albumen and sodium chlorid until all of the ingredients mentioned have become thoroughly incorporated together, and then drying the entire mixture by subjecting the same to a blast of warm air.

In testimony whereof I affix my signature in presence of two witnesses.

ANDREW A. DUNHAM.

Witnesses:
F. J. WALSH,
EDWIN T. MURDOCH.